United States Patent [19]
Crane

[11] 3,729,219
[45] Apr. 24, 1973

[54] JOINT FOR CONNECTING SECTIONS OF A MEMBER SUBJECT TO CYCLIC COMPRESSIVE LOADING

[75] Inventor: Robert M. Crane, Dallas, Tex.

[73] Assignee: United States Steel Corporation, Pittsburgh, Pa.

[22] Filed: Dec. 24, 1970

[21] Appl. No.: 101,215

[52] U.S. Cl. ................................. 287/125, 287/2
[51] Int. Cl. .................................... F16b 7/18
[58] Field of Search ................. 287/125, 2, 117

[56] References Cited

UNITED STATES PATENTS

| | | | |
|---|---|---|---|
| 2,045,520 | 6/1936 | Davison | 285/333 |
| 3,489,445 | 1/1970 | Kammerer, Jr. | 285/117 |
| 1,907,522 | 5/1933 | Eaton | 287/125 |
| 756,476 | 4/1904 | Connolly et al. | 287/125 X |
| 2,569,275 | 9/1951 | Baker | 287/2 |
| 1,943,879 | 1/1934 | Rea | 287/125 X |

*Primary Examiner*—Andrew V. Kundrat
*Attorney*—Walter P. Wood

[57] ABSTRACT

A joint for connecting sections of a member which is subject to cyclic compressive loading. Such joints are used, for example, in the piston rods of single-acting reciprocating pumps, and may fail through fatigue. The joint comprises a stud threadedly engaged with the end of at least one of the sections, and means surrounding the stud and transmitting loads independently of the stud. The stud has a substantially lower modulus of elasticity than the load-transmitting means.

4 Claims, 4 Drawing Figures

Patented April 24, 1973　　　　　　　　　　　　3,729,219
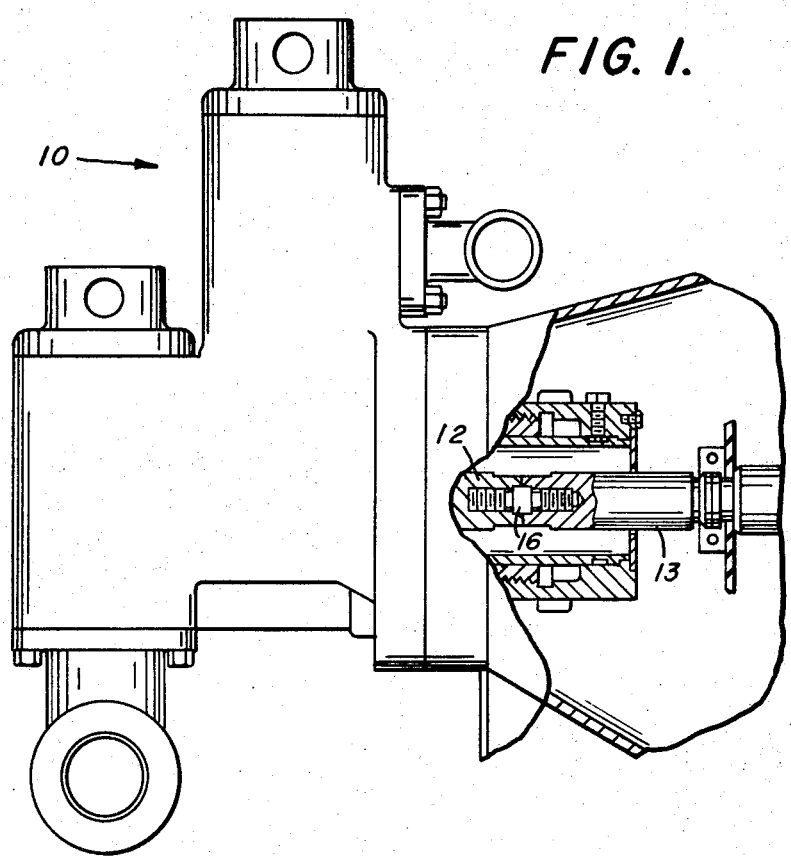
FIG. 1.
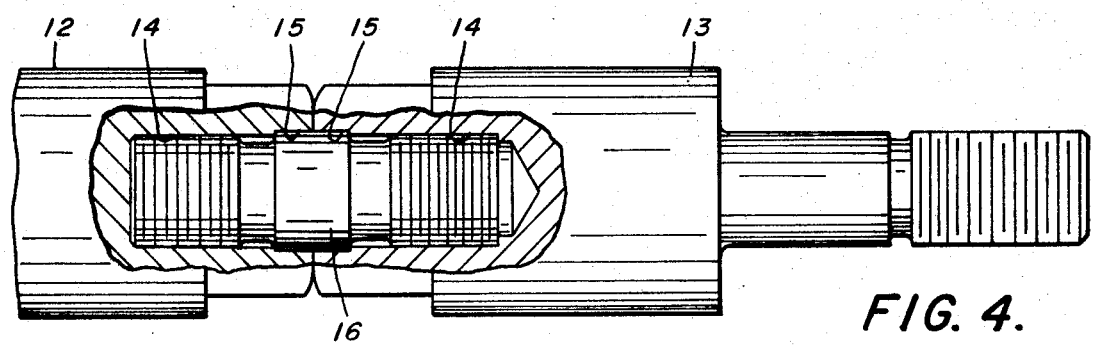
FIG. 2.
FIG. 3.
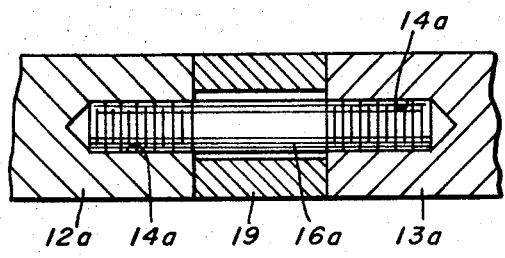
FIG. 4.
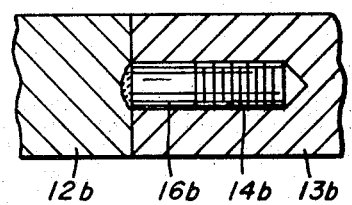
INVENTOR.
ROBERT M. CRANE
By *Walter P. Wood*
Attorney

JOINT FOR CONNECTING SECTIONS OF A MEMBER SUBJECT TO CYCLIC COMPRESSIVE LOADING

This invention relates to an improved joint for connecting sections of a member which is subject to cyclic compressive loading.

The piston rod of a high-pressure, single-acting reciprocating pump is one example of a member in which my joint can be used to particular advantage. To facilitate assembly the rod may be formed of two sections with a threaded joint connecting them end-to-end. During a power stroke the rod is subject to a high-compressive load, and during a return stroke a negligible load. This cyclic loading often induces fatigue failure of the joint. Nevertheless it is apparent my invention has broader application where similar problems are encountered.

An object of my invention is to provide, in a sectional member subject to cyclic compressive loading, an improved joint which connects the sections and offers greater resistance to fatigue than joints used heretofore.

A further object is to provide a joint which affords the foregoing advantage yet is of simple construction and readily assembled.

In the drawing:

FIG. 1 is a side elevational view, partly in section, of a pump, the piston rod of which is formed of sections connected end-to-end with my improved joint;

FIG. 2 is a side elevational view, partly in section and on a larger scale, of the rod sections and joint shown in FIG. 1;

FIG. 3 is a longitudinal sectional view showing a modification; and

FIG. 4 is a longitudinal section showing another modification.

FIG. 1 shows a high pressure, single-acting reciprocating pump 10 which is of conventional construction apart from the joint of the present invention. The pump has a piston rod which is formed of first and second sections 12 and 13 connected end-to-end. Section 12 leads to a piston and section 13 to a drive, neither of which is shown since they are not involved in my invention. The rod is subject to a large compressive load as it moves toward the left in making a power stroke, but only a negligible load as it moves toward the right in making a return stroke. The rod sections usually are of steel which has a modulus of elasticity around 29,000,000 to 30,000,000 psi.

In accordance with one embodiment of the present invention, as shown more clearly in FIG. 2, I drill bores 14 and counterbores 15 in the confronting end faces of both rod sections 12 and 13. I tap both bores 14. A stud 16 joins the two sections together. Opposite end portions of the stud are threadedly engaged with the tapped bores 14 of the respective sections. Preferably the central portion of the stud has a larger diameter than the threaded portions and is closely received in the counterbores 15 to assist in aligning the sections. The stud is of a material which has a much lower modulus of elasticity than the steel used in the rod sections. My preferred materials are aluminum-bronze or titanium, which have moduli of elasticity around 17,000,000 psi and 16,000,000 psi respectively. In referring to "titanium", I mean either the unalloyed metal or various titanium-base alloys. Examples of other materials suitable for the stud are copper alloys, brasses, aluminum alloys, magnesium alloys, and plastics, such as nylon.

FIG. 3 shows a modification in which I separate the two rod sections 12a and 13a with a sleeve 19 of a material which has a much higher modulus of elasticity. An example of a suitable material is tungsten carbide, which has a modulus of elasticity around 80,000,000 psi. The stud 16a of this modification can be of the same steel as the rod sections, and it is threadedly engaged with tapped bores 14a in the ends of both sections.

FIG. 4 shows another modification in which a stud 16b is joined permanently to the end face of one rod section 12b. The stud is of a material which has a relatively low modulus of elasticity, similar to stud 16 of FIG. 2. I can employ a conventional friction-welding process for jointing the stud to the rod section. The other rod section 13b has a tapped bore 14b threadedly receiving the stud.

In operation, I assemble the rod sections and stud as shown in FIG. 2, 3 or 4, but preferably tighten the parts only enough to hold them together. The stud is prestressed with a relatively small tensile load, typically about 15,000 to 20,000 psi. Material surrounding the stud is prestressed under a relatively small compressive load, typically about 3,000 to 4,000 psi. Subsequently, when I place the rod in service, a larger compressive load is applied cyclically to the rod sections. The material surrounding the stud transmits the compressive load from section 13, 13a or 13b to section 12, 12a or 12b always independently of the stud 16, 16a or 16b. This load further compresses the surrounding material, but produces equal strain deformations in the surrounding material and in the stud. Tensile stress in the stud is lowered cyclically as the load is applied.

Since the modulus of elasticity of the stud is less than that of the surrounding load-transmitting material, the dynamic or cyclic stress range on the stud is smaller than the range encountered with a conventional threaded connection. The latter is equivalent to using a stud which has the same modulus of elasticity as the surrounding material. The advantage can best be demonstrated by taking an example, which of course is not intended to limit my invention. In this example, the joint is constructed as shown in FIG. 2. The rod sections are steel, which has a modulus of elasticity of about $30 \times 10^6$ and an annular cross-sectional area ($A_R$) surrounding the stud of 6.56 square inches. The stud is aluminum-bronze, which has a modulus of elasticity of about $17 \times 10^6$ and a cross-sectional area of ($A_S$) 1.35 square inches. A cyclic compressive load of 118,000 pounds is applied to the rod.

$$\text{Strain on joint} = \frac{\text{Compressive load on rod}}{(A_R \times \text{Rod modulus}) + (A_S \times \text{Stud modulus})}$$

$$= \frac{118,000}{(6.56 \times 30 \times 10^6) + (1.35 \times 17 \times 10^6)}$$

$$= 537 \text{ MICRO INCHES}$$

STRESS = STRAIN × MODULUS OF ELASTICITY

DYNAMIC STRESS RANGE ON STUD = 537 MICRO INCHES × $17 \times 10^6$
= 9100 psi

If both the stud and surrounding material are steel, which has a modulus of elasticity of about $30 \times 10^6$, similar calculations show a stress range of 14,900 psi. Thus in this example my invention lowers the stress range on the stud by almost 40 percent. The lower the stress range, the less the chance of fatigue failure.

From the foregoing description it is seen that my invention affords a simple easily assembled joint for connecting sections of a rod subject to cyclic compressive loading and effectively forestalling fatigue failure. While I have found the joint particularly useful when applied to pump piston rods, it has broader utility for rods to which such loads are applied.

I claim:

1. In a member which is subject to cyclic compressive loading and is formed of first and second sections connected end-to-end, the confronting ends of said sections having bores and counterbores, said bores being tapped, an improved joint comprising a stud having threaded portions adjacent each end engaged in said tapped bores and having a portion of larger diameter than its threaded portions closely engaging said counterbores, said stud being prestressed with a relatively small tensile load, and means integral with said sections and surrounding said stud for transmitting compressive loads from one section to the other independently of said stud, said load-transmitting means being prestressed with a relatively small compressive load, said stud having a substantially lower modulus of elasticity than said load-transmitting means.

2. A joint as defined in claim 1 in which said sections are of steel and have a modulus of elasticity around 29,000,000 to 30,000,000 psi, and said stud is of a metal selected from the group consisting of aluminum-bronze and titanium.

3. A joint as defined in claim 1 in which said member is a piston rod of a high-pressure, single-acting reciprocating pump.

4. In a member which is subject to cyclic compressive loading and is formed of first and second sections connected end-to-end, the end of said first section having a tapped bore, an improved joint comprising a stud friction-welded to the end of said second section and having a threaded end portion engaged in said bore, said stud being prestressed with a relatively small tensile load, and means integral with said first section and abutting said second section and surrounding said stud for transmitting compressive loads from one section to the other independently of said stud, said load-transmitting means being prestressed with a relatively small compressive load, said stud having a substantially lower modulus of elasticity than said load-transmitting means.

* * * * *